United States Patent
Schroeder

(10) Patent No.: US 6,486,657 B2
(45) Date of Patent: Nov. 26, 2002

(54) MALFUNCTION DETECTOR FOR MAGNETORESISTOR SPEED AND POSITION SENSORS

(75) Inventor: Thaddeus Schroeder, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 1 day.

(21) Appl. No.: 09/780,322

(22) Filed: Feb. 9, 2001

(65) Prior Publication Data

US 2002/0109501 A1 Aug. 15, 2002

(51) Int. Cl.[7] ................................................. G01B 7/14
(52) U.S. Cl. ............................. 324/207.21; 324/207.25
(58) Field of Search ........................ 324/207.21, 207.25, 324/207.22, 207.13, 207.18, 207.12, 174

(56) References Cited

U.S. PATENT DOCUMENTS

| | | | | |
|---|---|---|---|---|
| 4,835,467 A | * | 5/1989 | Gokhale ..................... 324/166 |
| 4,926,122 A | | 5/1990 | Schroeder et al. ..... 324/207.13 |
| 4,939,456 A | | 7/1990 | Morelli et al. ......... 324/207.21 |
| 5,359,238 A | * | 10/1994 | Lesko ......................... 307/358 |
| 5,621,315 A | * | 4/1997 | Ikeuchi et al. ......... 324/207.12 |

\* cited by examiner

Primary Examiner—Edward Lefkowitz
Assistant Examiner—Subhash Zaveri
(74) Attorney, Agent, or Firm—Margaret A. Dobrowitsky

(57) ABSTRACT

A malfunction detector for magnetoresistive device sensors includes a window discriminator, a rotation indication circuit, and an alternative failure circuit. The window discriminator includes minimum and maximum voltage comparators, wherein if the sensor output signal is outside reference voltages, a first error signal is output. A rotation indication comparator outputs a square wave signal if the sensor output signal is detected. An alternative failure circuit includes a peak detector, a valley detector and a voltage comparator, wherein if a voltage differential between high and low values is less than a predetermined voltage differential, a second error signal is output.

7 Claims, 3 Drawing Sheets

MALFUNCTION DETECTOR FOR MAGNETORESISTOR SPEED AND POSITION SENSORS

TECHNICAL FIELD

The present invention relates to semiconductor magnetoresistive devices, also known in the art as magnetoresistors, employed in position and speed sensors, and more particularly to a malfunction detector which uses the output signal to monitor the functionality of speed and position sensors.

BACKGROUND OF THE INVENTION

It is well known in the art that the resistance modulation of magnetoresistors can be employed in position and speed sensors with respect to moving ferromagnetic materials or objects (see for example U.S. Pat. Nos. 4,835,467, 4,926,122, and 4,939,456). In such applications, the magnetoresistor (MR) is biased with a magnetic field and electrically excited, typically, with a constant current source or a constant voltage source. A magnetic (i.e., ferromagnetic) object rotating relative, and in close proximity, to the MR, such as a toothed wheel, produces a varying magnetic flux density through the MR, which, in turn, varies the resistance of the MR. The MR will have a higher magnetic flux density and a higher resistance when a tooth of the rotating target wheel is adjacent to the MR than when a slot of the rotating target wheel is adjacent to the MR. Angular position information is contained in the location of target wheel tooth edges (i.e., tooth/slot transitions), and at these locations the output signals of the MRs are by design unequal so that their differential signal is nonzero.

High accuracy and repeatability magnetic position sensors employ two matched sensing elements such as magnetoresistors or Hall generators. They are spaced a few millimeters apart from each other, either in the axial direction (dual track target wheels) or along the target periphery (sequential sensors). The primary purpose of using two matched sensing elements is common mode signal rejection, since the sensing elements are equally affected by temperature and air gap. Presently, selection of matched MR pairs, a tight process control during all phases of sensor manufacture with a final testing of each sensor, is employed to build sensors meeting the required specifications. Unfortunately, this approach increases the final cost of the sensor.

Currently, variable reluctance (VR) sensors are the most common types of anti-lock braking system (ABS) wheel speed sensors. They are rugged and inexpensive, but are incapable of sensing zero wheel speed. A feature demanded by an increasing number of sophisticated ABS implementations. Also, they do not lend themselves to easy monitoring and automated fault detection. In contrast, semiconductor magnetoresistors manufactured from InSb, InAs, and other compound semiconductors provide large signal outputs down to zero wheel speed and, being resistors, they allow for continuous monitoring and fault detection by simple means without interfering with the wheel speed sensing process.

FIG. 1 shows a present wheel speed sensor utilizing a single MR sensor 100 driven by a constant current source 120 powered by a supply voltage $V_B$ with output voltage $V_S$ wherein the passage of a tooth 140 of the rotating target wheel 180 produces a high output voltage and the passage of a slot 160 produces a low output voltage. A constant current source 100 is the preferred drive method for single MR sensors. The use of a constant voltage drive, however, would not affect a malfunction detection system.

FIG. 2 depicts the output voltage $V_S$ corresponding to the two extreme operating conditions within the specified tolerance range of the sensor 100 as $V_{S1}$ and $V_{S2}$. The MR sensor 100 will produce the highest output voltage signal $V_S = V_{S1}$ when the MR sensor is simultaneously operating at the lowest temperature, smallest air gap, and largest MR drive current, all within the specified tolerance range, however. The MR sensor 100 will produce the lowest output voltage signal $V_S = V_{S2}$ when the MR sensor is simultaneously operating at the highest temperature, largest air gap, and smallest MR drive current, all within the specified tolerance range, however. The voltage span between the largest value of $V_S = V_{MAX}$ and the smallest value of $V_{S2} = V_{MIN}$ defines the correct operating range of the sensor 100 with a corresponding output signal voltage $V_S$. That is, $V_{MIN} < V_S < V_{MAX}$. Monitoring a failure of the MR sensor 100 requires that the maximum output voltage $V_S$ not exceed $V_{MAX}$ and that the minimum output voltage $V_S$ will not fall below $V_{MIN}$.

The output signal $V_S$ exceeding $V_{MAX}$ may, for example, be indicative of such potential problems as too large a MR drive current 120, defective MR die, bad wiring, bad connector, insecure sensor, or loose target wheel mount. The output signal $V_S$ falling below the value of $V_{MIN}$ may, for example, be indicative of a partial short circuit, total short circuit, insufficient MR drive current 120, defective MR die, insecure sensor, or loose target wheel mount.

FIG. 3 shows a present wheel speed sensor utilizing a dual MR sensor 200 driven by a constant supply voltage $V'_B$ with output voltage $V'_S$ wherein the passage of a tooth 240 of the rotating target wheel 280 produces a high output voltage and the passage of a slot 260 produces a low output voltage. A constant voltage source $V'_B$ is the preferred drive method for dual MR sensors. The use of constant current drives, however, would not affect a malfunction detection system.

FIG. 4 depicts the output voltage $V'_S$ corresponding to the two extreme operating conditions within the specified tolerance range of the sensor 200 as $V'_{S1}$ and $V'_{S2}$. The MR sensor 200 will produce the highest output voltage signal $V'_S = V_{S1}$ when the MR sensor is simultaneously operating at the lowest temperature, smallest air gap, and largest MR drive voltage $V'_B$, all within the specified tolerance range, however. The MR sensor 200 will produce the lowest output voltage signal $V'_S = V'_{S2}$ when the MR sensor is simultaneously operating at the highest temperature, largest air gap, and smallest MR drive voltage $V'_B$, all within the specified tolerance range, however. The voltage span between the largest value of $V'_{S1} = V_{MAX}$ and the smallest value of $V'_{S1} = V'_{MIN}$ defines the correct operating range of the sensor 200 with a corresponding output signal voltage $V'_S$.

That is, $V'_{MIN} < V'_S < V'_{MAX}$. Monitoring a failure of the MR sensor 200 requires that the maximum output voltage $V'_S$ not exceed $V'_{MAX}$ and that the minimum output voltage $V'_S$ will not fall below $V'_{MIN}$.

The output signal $V'_S$ exceeding $V'_{MAX}$ may, for example, be indicative of such potential problems as too large a MR drive voltage $V'_B$, one or two defective MR dies, bad wiring, bad connector, insecure sensor, or loose target wheel mount. The output signal $V'_S$ falling below the value of $V'_{MIN}$ may, for example, be indicative of a partial short circuit, total short circuit, insufficient MR drive voltage $V'_B$, one or two defective MR dies, insecure sensor, or loose target wheel mount.

Accordingly, it is necessary when monitoring either single or dual MR speed and position sensors for malfunction to observe the value of the output signal within a maximum and minimum voltage envelope.

SUMMARY OF THE INVENTION

The present invention is a sensor malfunction detection method and system applicable to MR speed and position sensors. The sensor malfunction detection method and system is used in conjunction with passive MR sensor configurations such as depicted in FIGS. 1 and 2 wherein the sensor contains only the MR or MRs and no processing electronics. The raw MR signal $V_S$ or $V'_S$ of FIGS. 1 and 2 could be transmitted to an off-site processor containing the malfunction detection circuitry. If the processing electronics is integrated with the sensor, the malfunction detection circuitry could also be integrated with the sensor. However, some fault detecting functions would be difficult to perform within the sensor such as, for example, an integrity check for the connections between the integrated sensor and the controller receiving the sensor output signal. The present invention would be particularly beneficial in ABS where the absence of signal pulses would normally be interpreted as the wheel not rotating.

The present invention compares a voltage output of a MR sensor to a maximum and minimum reference voltage to determine if a failure has occurred. A malfunction detector for magnetoresistor sensors includes a window discriminator, a rotation indication circuit for providing a position signal used by a controller to determine position and speed, and an alternative failure circuit. The window discriminator monitors whether the sensor output voltage is within the correct range. The rotation indication circuit monitors wheel rotation and the alternative failure circuit monitors the magnitude of the raw MR signal in order to recognize failure modes undetectable by the window discriminator such as overheating of the dual MR sensor which may keep the sensor signal within the correct voltage range when its magnitude might become unacceptably low.

Accordingly, it is an object of the present invention to provide a malfunction detector for MR speed and position sensors which observes values of the output signal within a maximum and minimum voltage envelope to monitor the functionality of speed and position sensors.

This, and additional objects, advantages, features, and benefits of the present invention will become apparent from the following specification.

DESCRIPTION OF THE PREFERRED EMBODIMENT

Figure 1:
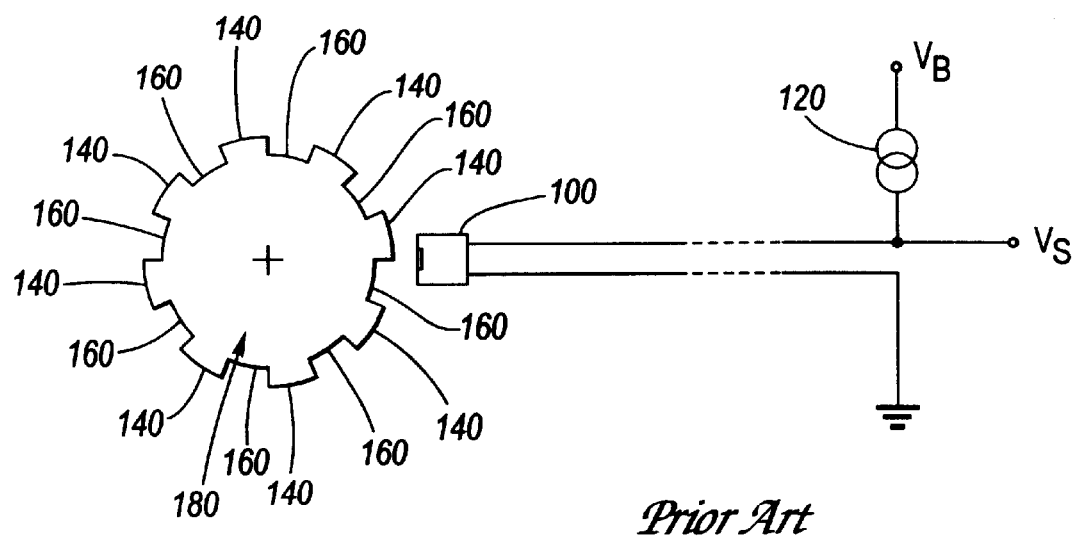
FIG. 1 depicts an example of a prior art single MR sensor monitoring a target wheel while supplied by a constant current source.
Figure 2:
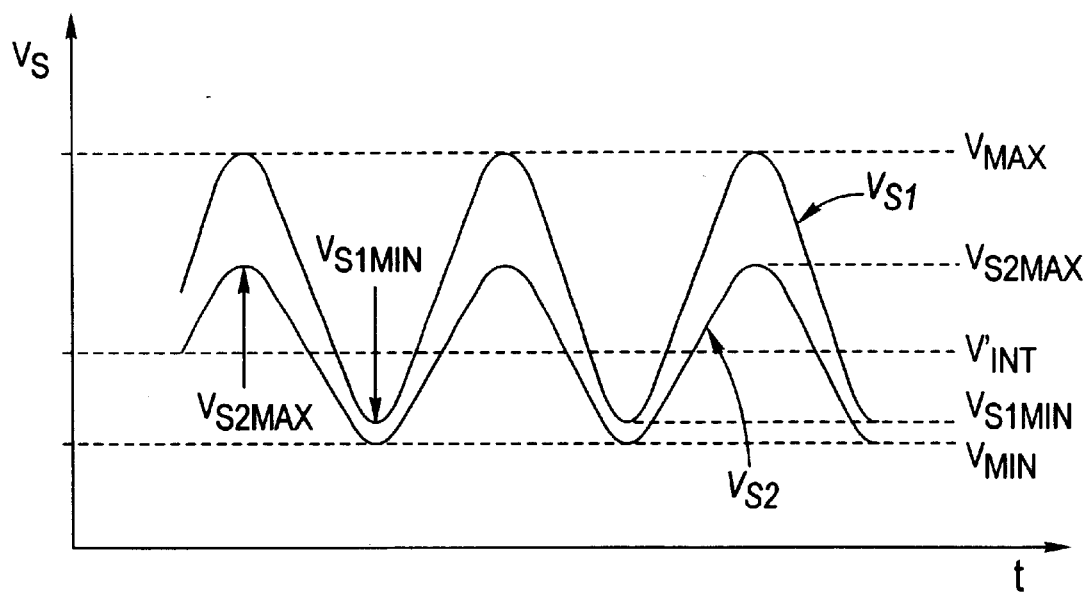
FIG. 2 depicts a window of output voltage signals as determined by temperature and air gap extremes of the single MR sensor of FIG. 1.
Figure 3:
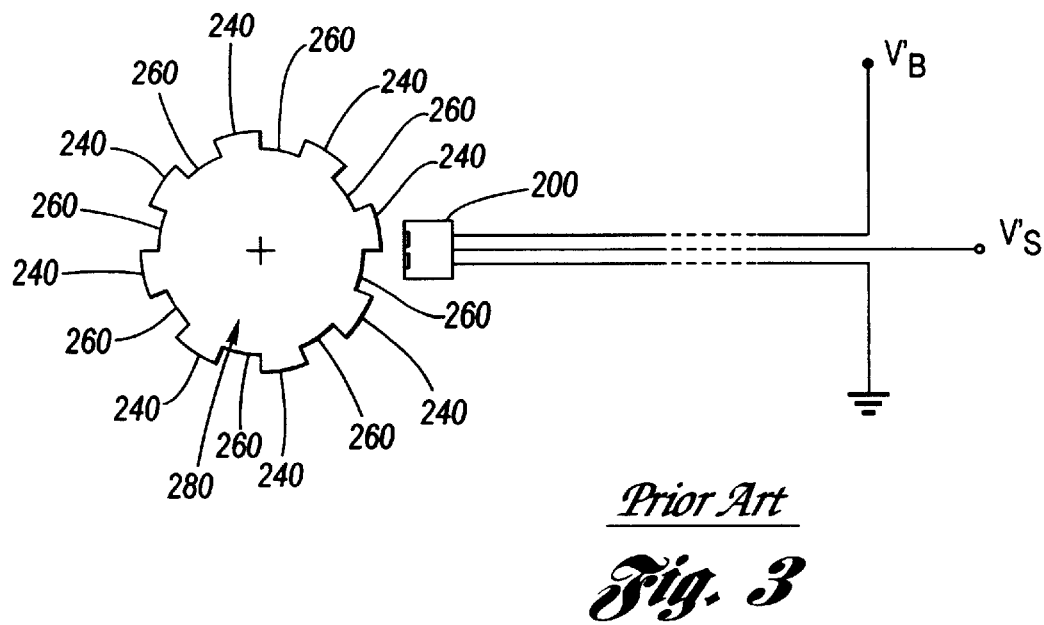
FIG. 3 depicts an example of a prior art dual MR sensor monitoring a target wheel while supplied by a voltage source.
Figure 5:
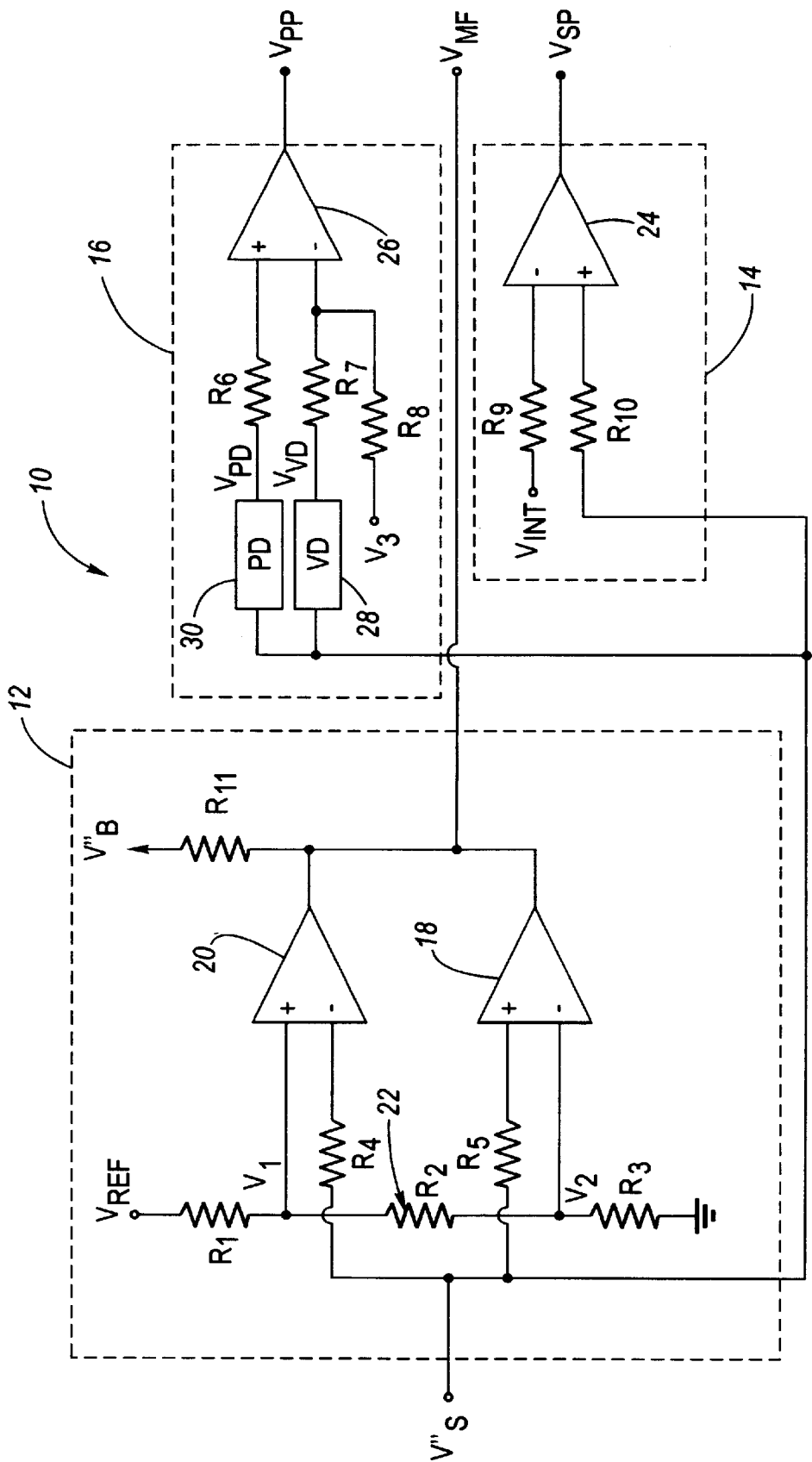
FIG. 5 is a schematic diagram of a malfunction detection circuit for magnetoresistor sensors according to the present invention.

FIG. 5 is a schematic diagram of a malfunction detector 10 for magnetoresistor sensors 100 or 200 of FIGS. 1 and 2.

The malfunction detector 10 includes a window discriminator circuit 12, a rotation indication circuit 14, and an alternative failure circuit 16. The input voltage $V''_S$ represents the MR signal output voltage $V_S$ or $V'_S$ of FIGS. 1 and 2. Resistors $R_4$ and $R_5$ have, preferably, the same values. Resistors $R_6$, $R_7$, and $R_8$ have, preferably, the same values. Resistors $R_9$ and $R_{10}$ have, preferably, the same values. Resistor $R_{11}$ is a pull-up resistor for comparators 18 and 20 through the supply voltage $V''_B$. The reference voltage $V_{REF}$ frequently will just be the supply voltage $V''_B$. Although not explicitly shown, it is understood that all components have appropriate power supply connections as needed and required.

The window discriminator circuit 12 includes a minimum voltage comparator 18, a maximum voltage comparator 20, and a reference voltage circuit 22. The undivided supply voltage for the reference voltage circuit is $V_{REF}$. The reference voltage circuit 22 includes three voltage dividing resistors $R_1$, $R_2$, and $R_3$. One end of the divider resistor $R_1$ is connected to the voltage $V_{REF}$. The other end of the divider resistor $R_1$ is connected to a positive input terminal of the maximum voltage comparator 20 and to one end of the divider resistor $R_2$. The other end of the divider resistor $R_2$ is connected to a negative input terminal of the minimum voltage comparator 18 and one end of the divider resistor $R_3$. The other end of the divider resistor $R_3$ is grounded. The series sum of the divider resistors $R_2$ and $R_3$ and the series sum of the divider resistors $R_1$, $R_2$, and $R_3$ in conjunction with $V_{REF}$ provide the maximum reference voltage $V_2$ to the positive input terminal of the maximum voltage comparator 20 wherein $V_1$ represents is $V_{MAX}$ or $V'_{MAX}$ of FIGS. 1 and 2 with a small added voltage as a safety margin. The divider resistor $R_3$ and the series sum of the divider resistors $R_1$, $R_2$, and $R_3$ in conjunction with $V_{REF}$ provide a minimum reference voltage $V_2$ to the negative input terminal of the minimum voltage comparator 18 wherein $V_2$ represents $V_{MIN}$ or $V'_{MIN}$ of FIGS. 1 and 2 with a small subtracted voltage as a safety margin.

The signal $V''_S$ is input into the negative input terminal of the maximum comparator 20 through a first input resistor $R_4$ and into the positive input terminal of the minimum comparator 18 through a second input resistor $R_5$. Output terminals of the minimum and maximum comparators are connected and pulled-up with one end of a pull-up resistor $R_{11}$. The other end of the pull-up resistor $R_{11}$ is connected to an undivided supply voltage $V''_B$. If the signal $V''_S$ is greater than minimum reference voltage $V_2$ and less than maximum reference voltage $V_1$, $V_{MF}$ will be a high voltage thereby indicating that the sensor output voltage $V_S$ or $V'_S$ is not out of range. If the signal $V''_S$ is less than minimum reference voltage $V_2$ or greater than maximum reference voltage $V_1$, $V_{MF}$ will be a low voltage thereby indicating that the sensor output voltage $V_S$ or $V'_S$ is out of range and an error condition exists.

The rotation indication circuit 14 conventionally converts an analog signal from the MR signal output into a square wave utilized by a controller, as for example an anti-lock braking system (ABS) controller, and includes a rotation indication comparator 24. The signal $V''_S$ is connected to a positive input terminal of the rotation indication comparator 24 through a third input resistor $R_{10}$. The intermediate reference voltage $V_{INT}$ is input into a negative input terminal of the rotation indication comparator 24 through a fourth input resistor. In the case of a single MR sensor, such as MR sensor 100 of FIG. 1, $V_{INT}$ is preset to $(V_{S2MAX}+V_{S1MIN})/2=V'_{INT}$ as defined in FIG. 2 which is equivalent to $(V_1+V_2)/2$ and can be obtained from a center tap of $R_2$. In the case of a dual MR sensor, such as MR sensor 200 of FIG. 2, $V_{INT}$ is set to $V''_B/2$. If the magnitude of $V''_S$ is greater than $V_{INT}$, a high signal $V_{SP}$ will be output, and if the magnitude of $V''_S$ is less than $V_{INT}$, a low signal $V_{SP}$ will be output. Above a certain predetermined rotation speed, $V_{SP}$ is interpreted by the controller as a square wave indicative of wheel rotation.

An alternative failure circuit 16 includes a voltage comparator 26, a valley detector 28, and a peak detector 30. The alternative failure circuit 16 monitors the magnitude of $V''_S$ in order to recognize failure modes undetectable by the window discriminator circuit 12. One such failure could be overheating of the dual MR sensor 200 that will keep the MR sensor output signal $V'_S$ of FIG. 2 within the correct voltage region when its magnitude might become unacceptably low.

An input terminal of the peak detector 26 is connected to $V''_S$ and the output terminal of the peak detector 26 is connected to a positive input terminal of 10 the voltage comparator 24 through a fifth input resistor $R_6$. An input terminal of the valley detector 28 is connected to $V''_S$ and the output terminal of the valley detector 28 is connected to a negative input terminal of the voltage comparator 24 through a sixth input resistor $R_7$. A reference voltage $V_3$ is input into the negative input terminal of the voltage comparator 24 through a seventh input resistor $R_8$ in is parallel with the output of the valley detector 28. Peak and valley detector circuits are well known in the art and the detail of each circuit need not be illustrated.

Figure 4:
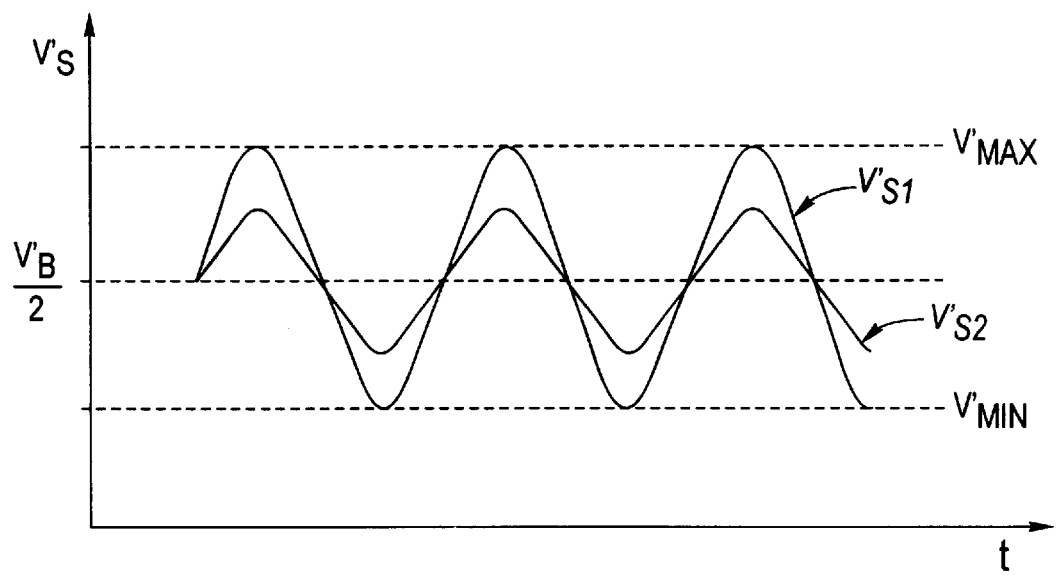
FIG. 4 depicts a window of output voltage signals as determined by temperature and air gap extremes of the dual MR sensor of FIG. 3.

The peak detector 26 outputs a DC voltage $V_{PD}$ equal to the highest voltage of the signal $V''_S$. The valley detector 28 outputs a DC voltage $V_{VD}$ equal to the lowest voltage of the signal $V''_S$. The reference voltage $V_3$ is chosen such that the output voltage of comparator 26 $V_{PP}$ will be high if ($V_{PD}-V_{VD}$) is greater than the minimum allowable difference ($V_{MAX}-V_{MIN}$) of FIG. 2 for the single MR sensor 100 of FIG. 1 or if ($V_{PD}-V_{VD}$) is greater than the minimum allowable difference ($V'_{MAX}-V'_{MIN}$) of FIG. 4 for the dual MR sensor 200 of FIG. 2. Otherwise the output voltage of comparator 26 $V_{PP}$ will be low thereby indicating an error condition.

$V_{MF}$ takes on a crucial role when comparator 24 does not output any square wave pulses $V_{SP}$, which is interpreted as the wheel not turning. However, even an occasional malfunction signal from $V_{MF}$ in the presence of apparently correct $V_{SP}$ pulses might indicate a latent problem and could be noted by an ABS controller. Only a sensor 100 or 200 and a malfunction detection method for a single wheel has been presented. An ABS controller can obtain additional diagnostic information by comparing data from all wheel sensors and malfunction detectors.

Although the circuitry shown in the present invention is of the analog type, the malfunction can be performed digitally as well, for example using a microprocessor, digital signal processor, or the ABS controller itself. The digital implementation of the analog circuitry of the present invention is well known in the art.

The malfunction detector for magnetoresistors may also be used to monitor the output signal of any magnetosensitive device.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A method for detecting malfunctions in a magnetosensitive device by evaluating the output signal thereof, comprising the steps of:

providing a maximum reference voltage;

providing an intermediate reference voltage;

providing a minimum reference voltage;

comparing an output signal from a magnetosensitive device to each of said minimum and maximum reference voltages, said step further comprising: generating an error detection signal responsive to said output signal being greater than said maximum reference voltage; and generating the error detection signal responsive to said output signal being less than said minimum reference voltage; and comparing the output signal to said intermediate reference voltage, said step further comprising: generating a first level signal responsive to said output signal being greater than said intermediate reference voltage; and generating a second level signal responsive to said output signal being less than said intermediate reference voltage.

2. The method of claim 1, wherein said first and second level signals in combination provide a square wave signal.

3. The method of claim 1, further comprising the steps of:

providing a predetermined differential signal value;

detecting a peak voltage of said output signal;

detecting a minimum voltage of said output signal;

generating an actual differential signal value between said peak and minimum voltages; and comparing said predetermined differential signal value to said actual signal value, said step further comprising: generating a second error detection signal responsive to said actual differential signal value being less than said predetermined differential signal value.

4. The method of claim 3, wherein said first and second level signals in combination provide a square wave signal.

5. A method for detecting malfunctions in a magnetosensitive device by evaluating the output signal thereof, comprising the steps of:

providing a predetermined differential signal value;

detecting a peak voltage of said output signal;

detecting a minimum voltage of said output signal;

generating an actual differential signal value between said peak and minimum voltages;

comparing said predetermined differential signal value to said actual signal value, said step further comprising: generating an error detection signal responsive to said actual differential signal value being less than said predetermined differential signal value; and comparing the output signal to said intermediate reference voltage, said step further comprising: generating a first level signal responsive to said output signal being greater than said intermediate reference voltage; and generating a second level signal responsive to said output signal being less than said intermediate reference voltage.

6. The method of claim 5, wherein said first and second level signals in combination provide a square wave signal.

7. In a circuit for magnetoresistive devices, the circuit including a rotation indication circuit comprising a rotation indication comparator and an intermediate reference voltage, wherein a first level signal is generated responsive to said output signal being greater than said intermediate reference voltage, and wherein a second level signal is generated responsive to said output signal being less than said intermediate reference voltage, the improvement thereto comprising circuitry for detecting malfunctions, said circuitry comprising:

a window discriminator circuit comprising: a maximum voltage comparator, a minimum voltage comparator, and a reference voltage, wherein a first error signal is generated responsive to said output signal being greater than said maximum reference voltage, and wherein the first error detection signal is generated responsive to said output signal being less than said minimum reference voltage; and an alternative failure circuit comprising: a peak detector, a valley detector, an alternative comparator, and an alternative reference voltage, wherein a second error detection signal is generated responsive to a detected differential signal derived from said output signal being less than a predetermined differential signal derived from said output signal and said alternative reference voltage.

* * * * *